(No Model.) 2 Sheets—Sheet 1.
J. H. BARLEY.
COMBINED HORSE RAKE AND CARRIER TRUCK.
No. 337,228. Patented Mar. 2, 1886.
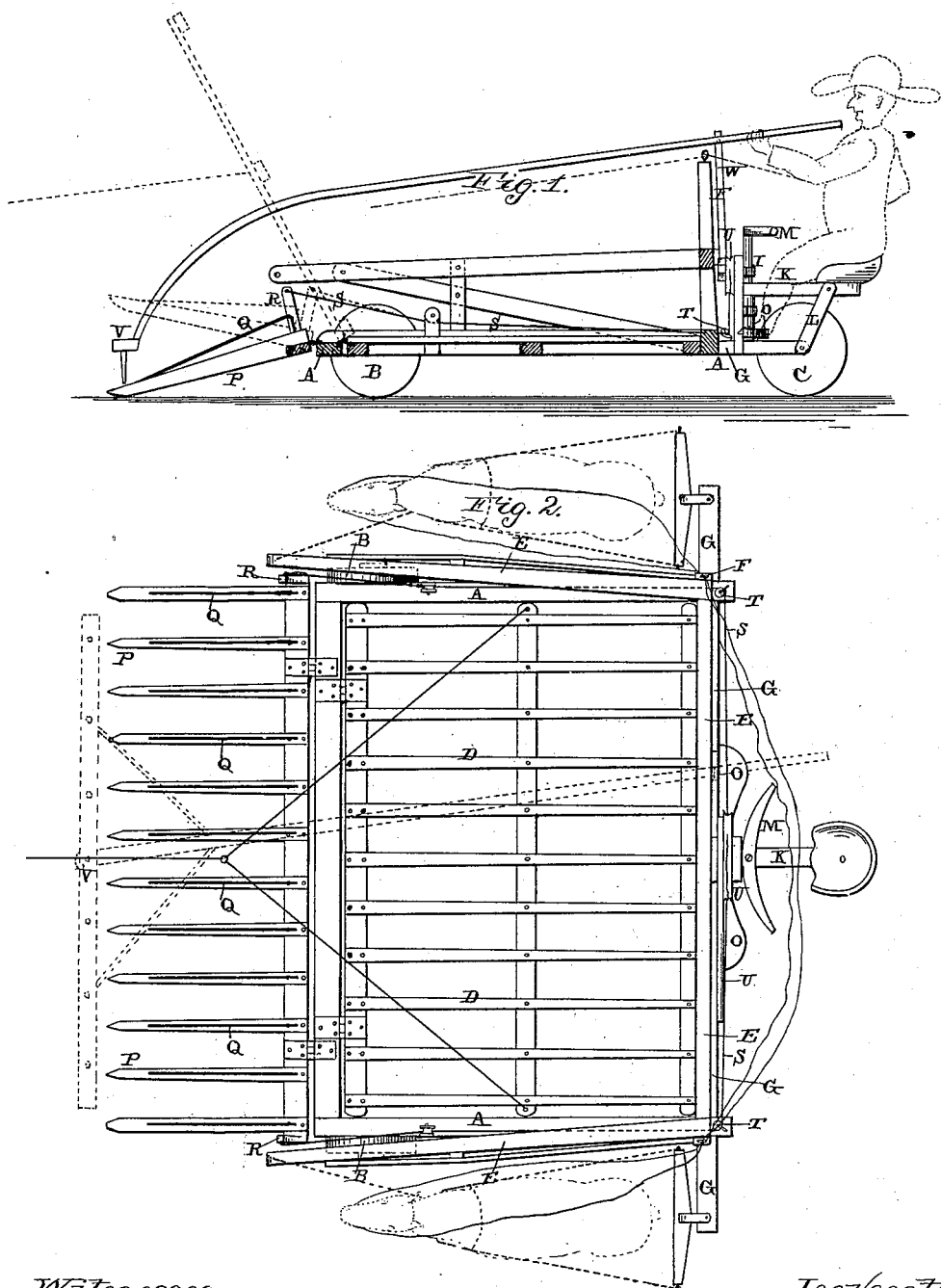
Witnesses  
J. W. Garner  
E. M. Kroger
Inventor:  
Jas. H. Barley,  
per  
J. A. Lehmann,  
Atty.

(No Model.) 2 Sheets—Sheet 2.
J. H. BARLEY.
COMBINED HORSE RAKE AND CARRIER TRUCK.
No. 337,228. Patented Mar. 2, 1886.
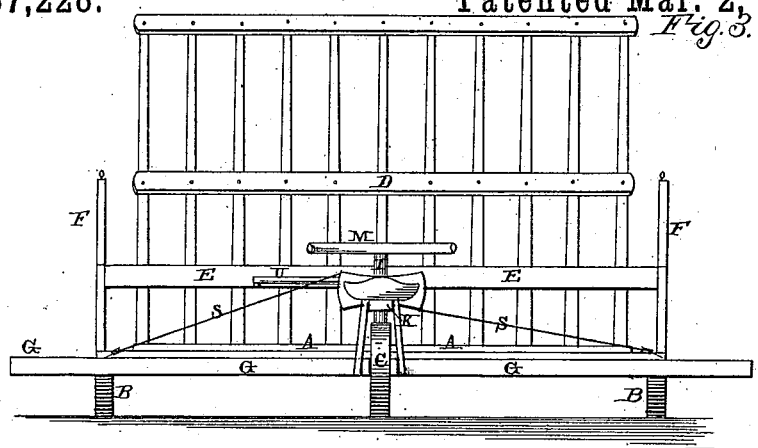
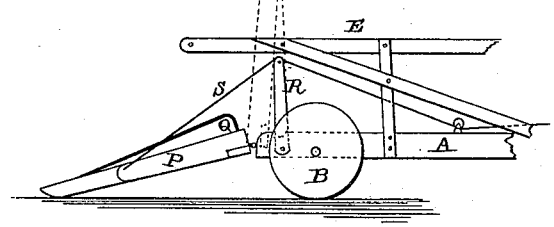
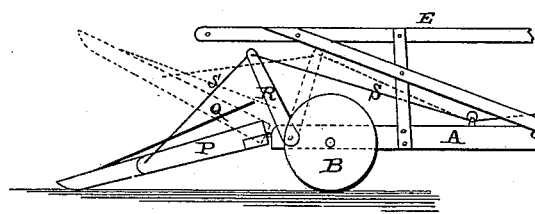
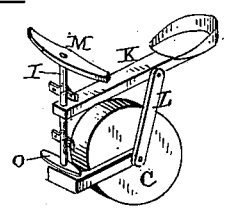
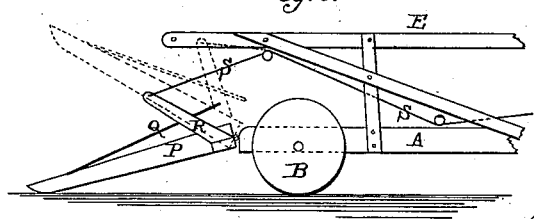
Witnesses:
J. W. Garner
E. M. Kroger
Inventor:
Jas. H. Barley,
per F. A. Lehmann, atty

UNITED STATES PATENT OFFICE.

JAMES H. BARLEY, OF SEDALIA, MISSOURI.

COMBINED HORSE-RAKE AND CARRIER-TRUCK.

SPECIFICATION forming part of Letters Patent No. 337,228, dated March 2, 1886.

Application filed September 19, 1884. Serial No. 143,480. (No model.)

*To all whom it may concern:*

Be it known that I, JAMES H. BARLEY, of Sedalia, in the county of Pettis and State of Missouri, have invented certain new and useful Improvements in Combined Horse Rakes and Carrier-Trucks; and I do hereby declare the following to be a full, clear, and exact description of the invention, such as will enable others skilled in the art to which it pertains to make and use it, reference being had to the accompanying drawings, which form part of this specification.

My invention relates to an improvement in combined horse-rakes and carrier-trucks; and it consists, first, in the combination of a truck mounted on low wheels, with the rake which is hinged to the front of the frame, and a suitable lifting mechanism which is connected to the rake, whereby the driver is enabled to lift the teeth vertically after the truck is loaded, so as to keep the hay in position while being carried to the place of stacking; second, in the combination of the truck provided with a hinged bottom, and the horse-rake which is loosely connected to the front edge of the truck; third, a truck provided with draft-bars, which extend beyond the rear corners of the truck, and by means of which the horses move the rake along, and having side railings, which serve to keep the hay upon the truck, and to the front ends of which the horses are fastened; fourth, in the combination of the truck and the rake which is connected thereto with the rudder-wheel and the driver's seat, all of which will be more fully described hereinafter.

The object of my invention is to form a speedy and effective means for gathering hay or grain from the field, and to haul it to the place of stacking on the same machine by which it is gathered, and to provide the machine with a means for speedily unloading the hay or grain after it has reached its destination.

Figure 1 is a side elevation of a combined rake and carrier-truck embodying my invention, and showing the hinged bottom in a raised position. Fig. 2 is a plan view of the same, showing the hinged bottom turned down. Fig. 3 is a rear view of the same, also showing the hinged bottom turned up. Figs. 4, 5, and 6 are side elevations showing slightly different constructions. Fig. 7 is a perspective of the driver's seat and the parts connected thereto.

A represents the frame of the truck or hay-receiver which is supported at its front end by the two wheels B, and at its rear end by the guide-wheel C. These wheels are only about twenty inches in diameter, so as to carry the bed of the frame close to the ground for convenience in loading the truck. The bottom of this truck is composed of a series of slats, D, which preferably run lengthwise of the machine, and around the two sides and the rear end of the truck is made a suitable railing, E, for the purpose of keeping the hay in position after it has been loaded upon the truck. The side rails also serve as a means of attachment to the horses, so that they can never move beyond a certain distance from the side of the truck. These side rails project forward beyond the hinges of the rake at their front ends, and have secured to their rear ends the uprights F, which have suitable guiding loops or rings formed upon their tops for the driving-lines to pass through. These lines pass outward in opposite directions from the driver through these guiding rings or loops upon the tops of the standards, and are thus kept out of the way of the hay or grain. Were it not for these standards and the guiding rings or loops the lines would have to extend diagonally across the hay or grain, and thus constantly be in the way.

Secured to the rear end of the truck is the draft-bar G, the ends of which project beyond the rear corners of the truck a suitable distance, so that the draft-animals can be attached to them. The draft-animals walk upon opposite sides of the frame and draw the truck and rake along. The animals are fastened to the end of this draft-bar by means of traces, and being fastened to the front ends of the side rails are always kept in the position shown in Fig. 2. By this construction the horses are entirely out of the way in drawing up to the stack and when discharging the load of hay out of the front of the truck. The horses are also brought conveniently under the control of the driver, enabling him while in his seat to drive the team and load and guide the truck at the same time, which he could not do were the horses hitched to the front of the truck. Where the horses are hitched to the front of the truck, two men are required to perform the same amount of work that can be accomplished by one where the horses are hitched as here shown. The rear end of the truck is supported upon the guiding-wheel C, which is provided with a yoke and stem, I, which works in an ordinary socket or hinge connecting it to the rear end of the frame of the truck. To the stem I the bar K is attached on which the driver's seat is placed, and supported directly over the wheel by the braces L, which are attached to the rear end of the bar K, and which extend down and are connected to the yoke on which the wheel turns.

Secured to the upper end of the stem I is a cross-piece, M, the ends of which form two handles for the driver to catch hold of, and thus assist him to turn the guiding-wheel in any direction for the purpose of controlling and guiding the machine; also, secured to the rear end of the truck-frame are suitable bars, O, against which the driver places his feet for the purpose of pushing the guiding-wheel around from side to side. The driver sitting upon the seat and using his feet, assisted by his hands, when necessary, can turn the guiding-wheel around in the direction in which he wishes the machine to move.

The rake P for gathering the hay or grain is hinged to the front part of the truck by means of suitable hinges, and this rake is composed of a head-piece, to which the teeth are secured. Upon the top of each tooth is secured an inclined metallic or wooden rod, Q, which serves to raise the hay or grain above the teeth and rake-head, so that the hay or grain can be readily moved backward from the teeth upon the truck. These inclined rods may either be secured at both of their ends to the teeth, or the rods may be fastened at their front ends only, and made to extend backward and upward, but without having their rear ends fastened to the teeth at all.

Secured to each end of either the rake-head or to the outer teeth are the two standards R, to the upper ends of which are fastened the cords, wires, or chains which pass backward around the guiding-pulleys T, and are connected to the operating-lever U. This lever is pivoted directly in front of the driver's seat, so that the driver can readily turn it upon its pivot through one-half of a circle. The cords, chains, or wires being attached to opposite sides of the center of movement of this lever, when the lever is moved in one direction the standards are drawn backward, so as to raise the rake in the position shown in dotted lines in Fig. 1, and when the lever is moved in the opposite direction the rake is again dropped upon the ground.

The arrangement of the standards R can be slightly varied, if so desired. In Figs. 1, 2, and 6 the standards are shown as secured to the rake, and in Figs. 4 and 5 they are shown as secured to the truck. In Fig. 1 the cord S passes under a guiding-pulley, and is secured directly to the top of the standard. In Fig. 6 the cord passes under one pulley, then over the top of another, and is then fastened to the top of the standard. In Fig. 4 the standard is rigidly secured to the front of the truck, and upon its top is journaled a pulley, over which the cord passes. In Fig. 5 the standard is pivoted to the front of the truck, and the cord is fastened both to the upper end of the standard and to the rake. When the rake is raised upward, the standard is drawn backward, as shown in Fig. 5. After the truck has been loaded with hay, and the hay is about to be driven to the stack, this rake is raised upward, so as to take it out of contact with the ground, and for the purpose of holding the hay in position upon the truck.

In order to load the machine to its fullest capacity, after the truck has been loaded the horse-rake may be gathered full of hay by moving the machine forward until the rake becomes loaded, when it may be raised from the ground with the points of the teeth turned slightly upward, and in that position carry this additional load of hay to the place of stacking. If desired, whenever a suitable amount of hay has been gathered upon the teeth, this may be thrown back upon the truck by stopping the forward motion of the truck, and then moving the lever so as to raise the rake-teeth in the position shown in dotted lines, and thus cause the rake-teeth to throw the hay back upon the truck.

For the purpose of drawing the hay or grain back from the teeth upon the body of the truck while the truck is moving along, the driver uses the rake V, which is provided with a bent handle, as shown. This rake is of ordinary construction, with the exception of the curved handle. The head of the rake, when preferred, is made long enough to extend from one end of the teeth of the horse-rake to the other. The handle is preferably curved, as shown, so that it will pass readily over the hay or grain which is raked back upon the truck.

In order to support this rake while the driver is forcing it outward over the top of the teeth of the horse-fork, the notched standard or support W is pivoted to the railing which extends along the rear end of the truck. The driver puts the handle into the notch in this support W, and then forces the rake outward over the top of the horse-rake, so as to catch over the top of the hay which has been gathered by the forward movement of the machine. The driver then disconnects the handle from this notch, and draws the hay back into the truck to any desired point. This operation is repeated from time to time as the machine moves along until the truck is loaded, and then the horse-rake is raised upward, as already described, and the machine is driven to the stack.

In order to enable the hay or grain to be lifted readily and quickly from the truck without the necessity of having to handle it, the bottom D of the truck is hinged to the front cross-beam of the truck, as shown in Fig. 2. The slats which form the bottom are braced rigidly together by cross-pieces, either as here shown or in any other way that may be preferred. This bottom supports the hay while it is upon the truck, and when it is desired to unload the hay from the truck the bottom is raised upward, as shown in Figs. 1 and 3, so as to throw the hay forward over the horse hay-rake upon the ground or stack that is being formed. This bottom is raised upward by attaching a rope or ropes to it, and then exerting a sufficient pull upon them to raise the bottom upward. After the load of hay is dumped the machine is backed, and the rake is drawn from under the hay, the bottom lowered into position, and the truck driven away for another load.

I do not limit myself to any particular construction of the bottom or the method of operating it, for these may be varied somewhat without departing from the spirit of my invention.

Having thus described my invention, I claim—

1. The combination and arrangement of the within described carrier-truck, substantially as shown, having a hay-gathering device connected to the front end of said truck, and the guiding-wheel pivotally connected to the rear end of the truck-frame with the draft-bar, which has its ends to project beyond the rear corners thereof, and the side railings, to which the horses are fastened in front, substantially as set forth.

2. The combination of the truck supported upon wheels at its front corners, and the horse-rake connected to the front end thereof, with the guiding-wheel pivotally connected to the rear end of the truck, and the driver's seat connected to the stem or pintle of the wheel-yoke and extending rearwardly and supported by braces directly over said wheel, substantially as specified.

3. The combination of the truck supported upon wheels at its front corners, the gathering-rake connected to the front end of said truck, and the guiding-wheel pivotally connected to the rear end thereof, the stem or pintle of the wheel-yoke, which is provided with a handle, and the driver's seat connected to the rear of said pintle and supported over the wheel, substantially as shown.

4. The combination of the carrier-truck with the gathering-rake loosely connected to the front end thereof, and the bottom which is hinged to the front end of the truck-frame, and which is adapted to be raised up from its rear end so as to discharge the load of hay or contents of the truck out forward over the rake, substantially as described.

5. The combination of the carrier-truck having a gathering device connected to the front end thereof, a hinged truck-bottom, and a means, substantially as shown, for raising the truck-bottom on its hinges, whereby the hay is unloaded at the forward end over the gathering device, substantially as set forth.

6. In a combined horse hay-rake and carrier-truck, the combination of the rake and truck having the rake hinged to the front end of the truck, and provided with standards attached to opposite ends of the rake, with the ropes, wires, or chains which are connected to said standards and extending rearwardly around the truck-frame and attached to a pivoted lever or wheel located upon the rear end of said truck, and the guiding-wheel which is pivotally attached to the rear end thereof, with the draft-bar, which has its ends to project beyond the rear corners of the truck-frame, and the side railings of said truck to which the horses are fastened in front, substantially as specified.

In testimony whereof I affix my signature in presence of two witnesses.

JAMES H. BARLEY.

Witnesses:
JAMES M. BYLER,
ABRAHAM COHN.